Feb. 18, 1930.  L. VON REIS  1,747,270
DEVICE FOR CUTTING SHEET GLASS
Filed Aug. 28, 1928  2 Sheets-Sheet 1
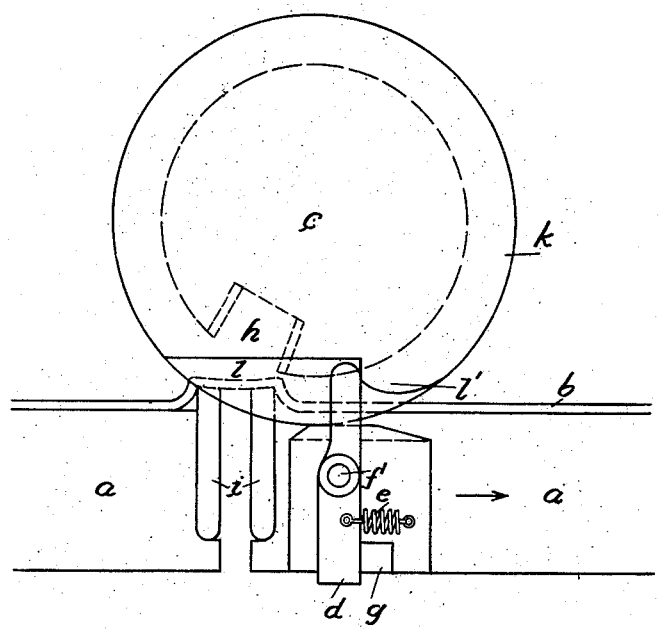
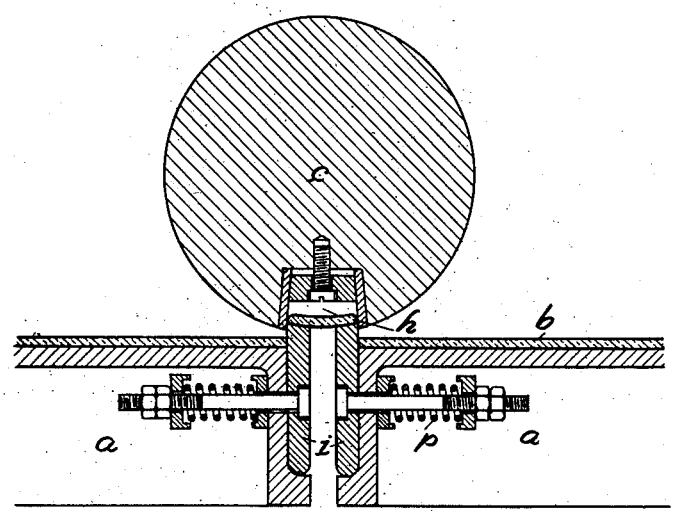

Feb. 18, 1930.    L. VON REIS    1,747,270
DEVICE FOR CUTTING SHEET GLASS
Filed Aug. 28, 1928    2 Sheets-Sheet 2
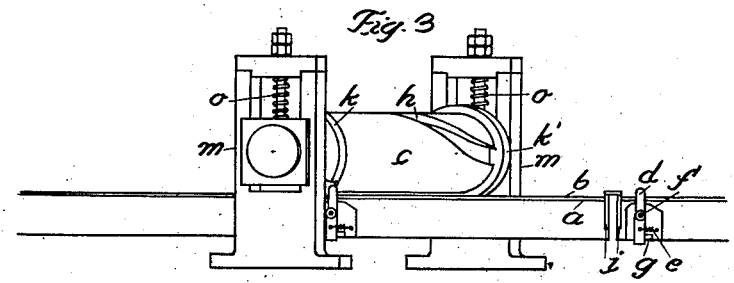
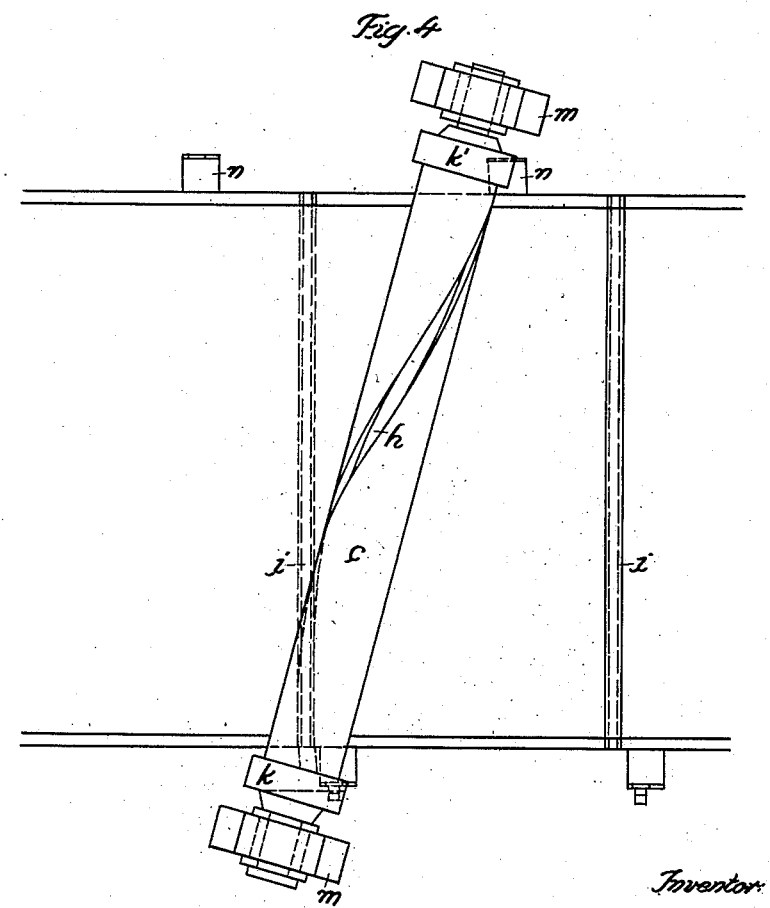

Patented Feb. 18, 1930

1,747,270

UNITED STATES PATENT OFFICE

LAMBERT von REIS, OF HERZOGENRATH, GERMANY, ASSIGNOR, BY MESNE ASSIGNMENTS, TO THE AMERICAN BICHEROUX COMPANY, A CORPORATION OF DELAWARE

DEVICE FOR CUTTING SHEET GLASS

Application filed August 28, 1928, Serial No. 302,485, and in Germany September 1, 1927.

This invention relates to a device for cutting sheet glass in plastic condition while being carried ahead, and it has more particularly reference to a device comprising a knife which is rotatable around a horizontal axis extending transversely of the sheet to be cut.

The invention has for its object to provide a device of the kind stated in which the blade of the rotatable knife is arranged along a helical line around the axis of rotation and designed to coact with rectilinear cutting blades arranged on the glass support. With a device constructed in this way the cut is performed gradually from one side edge of the glass sheet to the other so that sheets of any desired thickness may be severed with a minimum expenditure of power and without subjecting the blades to considerable stress. The device is especially adapted for use in combination with a travelling glass conveyor, such as a conveyor consisting of a series of successive travelling tables which carry the cutting blades with which the helical blade coacts. When used in connection with such a conveyor the cutting operations may be effected without stopping the movement of the conveyor. In this case, the most preferable cut, that is a cut extending at a right angle to the side edges of the sheet may be obtained by arranging the cutting blades of the conveyor at a right angle to the side edges thereof and the rotary main knife at such an angle with relation to the straight cutting blades that its helical blade unrolls along the straight cutting blades when rotated at a speed corresponding to the speed of the conveyor. The conveyor itself produces the rotation of the knife by the frictional engagement of its cutting blades with the helical cutting blade, no special means being therefore required for rotating the knife.

The accompanying drawings illustrate an embodiment of the cutting device according to the invention in connection with a travelling sheet glass conveyor.

Fig. 1 is a side view of the device, the bearing standards for the rotary knife being omitted, Fig. 2 is a transverse section, Fig. 3 a perspective side view, and Fig. 4 a plan view of the device.

$a$ is a travelling conveyor carrying a glass sheet $b$ which is supposed to be in plastic condition. $c$ is a roller forming the rotary body of the upper or main knife. This roller is provided in its surface with a helical groove $h$ which constitutes the cutting edge or edges of this knife. The knife body $c$ is provided at each of its ends with a flange $k$ and $k'$. The flange $k$ has a recess $l$ of the shape shown in Fig. 1. This recess forms a shoulder $l'$ which is adapted to be engaged by stops $d$ fastened on one of the sides of the conveyor. These stops consist of levers which are swingable on pins $f$ and drawn by means of springs $e$ against lugs $g$ in such a manner that they are normally held in a vertical position. $i$ are the lower knives or blades of the device which are carried by the conveyor and yieldably held thereon by means of springs $p$. $m$ are standards in which the knife $c$, $h$ is rotatable and adjustable in vertical direction. $o$ are springs exerting a downward pressure on the knife bearings and allowing the same to yield upwardly. Fastened on the side of the conveyor $a$ opposite the side carrying the levers $d$ are cams $n$ designed to lift the knife $c$, $h$ from the conveyor. The cutting blades $i$ and the axis of the knife $c$ form in a horizontal plane such an angle with relation to each other that by suitably rotating the roller $c$ the helical groove-shaped blade $h$ unrolls on the blades $i$.

The cutting device is preferably installed between a glass sheet forming machine and an annealing oven.

The operation of the described device is as follows: The conveyor $a$ which travels in the direction of the arrow shown in Fig. 1 carries the glass sheet $b$ ahead below the knife $c$. When inoperative the knife $c$ is held in a raised position free of the conveyor. As soon as the glass sheet should be cut, the roller knife $c$ is lowered so that the lever $d$ enters into the recess $l$ of the one flange $k$ and engages the shoulder $l'$ imparting rotation to the knife $c$ in such a manner that the cutting blades $i$ forming the counter knife thread into the helical cutting groove $h$ of the roller $c$. As the conveyor $a$ continues its movement, the rotation of the knife c started by the lever d is continued by the frictional engagement of the blades i with the groove h, so that the glass sheet, which is now between the two knives c, h and i is gradually severed through its entire breadth. For attaining straight cuts at right angles to the longitudinal edges of sheet b the cutting blades i are arranged vertically and the axis of the roller c obliquely with relation to the longitudinal edges of the conveyor, as may be seen from Fig. 4. A straight cut which is, however, oblique to the edges of the sheet b will be obtained when the blades i are disposed obliquely and the knife c vertically to the line of feed as well as when the two knives c and i, while maintaining the proper angle between them, are both arranged more or less obliquely to the line of feed or the longitudinal edges of the sheet. While one cutting blade or counter knife i would be sufficient, it is to be preferred to use two spaced parallel cutting edges i as shown whereby a strip of glass is cut out of the sheet so that a perfect separation of each two successive portions is attained.

The device can be used in the continuous as well as in the intermittent process of forming glass sheets. The conveyor may consist of a series of successive tables as shown, of individual tables or of an endless belt. When using a series of successive transporting tables as illustrated, the blades i are attached to the transverse edges of the tables which lie at a right angle to the direction of feed of the glass sheet b. This arrangement has the advantage that the strips of glass cut out of the sheet can fall down through the gap between two successive tables.

The number of counter knives i to be mounted on the conveyor may be chosen at will.

If in the intermittent glass sheet forming process the conveyors have to be returned to their initial position near the forming machine, the levers d when coming into contact with the flange k will be swung around the pins f against the action of the spring e so that breakage of the levers is avoided. When the levers d have passed the knife c and its flange k, they are swung by the springs e into their vertical operative position.

If it should happen that the knife c is not in a raised position during the return movement of the conveyor a, the protruding cutting blades i will nevertheless pass beneath the knife c because when coming into contact with the knife c same will be automatically raised by the cutting blades since it is yieldable vertically due to the arrangement of the springs o. I prefer, however, to provide means for positively lifting the knife c to a position free of the conveyor after each cutting operation and during the passage of the blades i beneath the knife c in the return movement of the conveyor. These means consist of the above-mentioned cams n which are designed to engage the flange k' of the knife c for raising the same.

There may also be used instead of the helical cutting groove h a solid helical blade projecting above the surface of the roller c. In this case the cutting blades i are substituted by suitable grooves in the conveyor forming the necessary cutting edges.

The forms of knives or blades shown are merely illustrative and may be changed; they may be single or double.

It will also be within the spirit of the invention to provide positive driving means for the knife c independent of the conveyor.

Having thus described my invention, what I claim as new and desire to secure by Letters Patent is:—

1. A device for cutting plastic sheet glass while in movement, comprising a rotatable body member above the path of movement of the glass, straight cutting blades arranged transversely and projecting upwardly of the said path of movement, and cutting blades formed on the said body member along a helical line around the axis of the member, these helical blades being adapted to coact with the said straight cutting blades to divide the glass from one of its side edges to the other when the body member is rotated.

2. In a device for cutting sheet glass in a plastic condition, the combination with a travelling conveyor having transverse straight cutting blades at predetermined distances, of a roller arranged above the conveyor at an angle with relation to the said straight cutting blades, a helical groove in the surface of the said roller forming cutting edges and adapted to coact with and unroll on the conveyor blades for dividing the glass along these blades.

3. In a device for cutting plastic sheet glass, the combination with a travelling conveyor having straight cutting blades at a right angle to the line of feed, of a roller arranged above the conveyor obliquely to the line of feed, a groove forming cutting margins extending along a helical line around the axis of the roller, this groove being adapted to be engaged by the cutting blades of the conveyor in the movement thereof and to unroll along these blades for dividing the glass sheet on lines lying at a right angle to the longitudinal edges of the sheet.

4. In a device for cutting plastic sheet glass, the combination with a travelling conveyor having straight transverse cutting blades at predetermined distances, of a roller arranged above the conveyor, a helical groove with cutting edges in the circumferential surface of the roller, and means on the conveyor for engaging the roller and placing the groove thereof into engagement with the cutting blades of the conveyor so as to cause the latter to thread into the groove and simultaneously rotate the roller during the continued movement of the conveyor until the cutting blades emerge again from the groove.

5. In a device for cutting plastic sheet glass, the combination with a travelling conveyor having straight transverse cutting blades at predetermined distances, of a roller arranged above the conveyor, a helical groove with cutting edges in the circumferential surface of the roller, means on the conveyor for engaging the roller and placing the groove thereof into engagement with the cutting blades of the conveyor, and means on the latter for lifting the said roller to a position free of the conveyor after each cutting operation and during the passage of the cutting blades of the conveyor beneath the roller in the return movement of the conveyor.

6. In a device for cutting plastic sheet glass, the combination with a travelling conveyor having straight transverse cutting blades at predetermined distances, of a roller arranged above the conveyor, a helical groove with cutting edges in the circumferential surface of the roller, a shoulder on one of the ends of the roller, levers on one side of the conveyor adapted to cooperate with the said shoulder for starting rotation of the roller and placing its groove into engagement with the cutting blades of the conveyor, and cams on the other side of the conveyor arranged so as to act on the other end of the roller for lifting the same free of the conveyor after each cutting operation and during the passage of the cutting blades of the conveyor beneath the roller in the return movement of the conveyor.

In testimony whereof I have signed my name to this specification.

LAMBERT von REIS.